United States Patent [19]
McKee
[11] Patent Number: 4,501,438
[45] Date of Patent: Feb. 26, 1985

[54] CLIPBOARD

[76] Inventor: Robert G. McKee, 30 W. Chicago Ave., Chicago, Ill. 60610

[21] Appl. No.: 283,982

[22] Filed: Jul. 16, 1981

[51] Int. Cl.[3] ........................ B32B 3/06

[52] U.S. Cl. ........................ 281/45; 248/451; 248/452; 24/67.11; 211/45; 211/50; 428/77; 428/81; 428/141; 428/192

[58] Field of Search ........................ 248/451-453; 24/67.11, 67.9, 67.3; 40/16.6, 23 R, 11 R, 16, 16.2, 348, 351; 428/77-79, 81, 99, 100, 141, 192, 542; 211/45, 50; 281/45

[56] References Cited

U.S. PATENT DOCUMENTS 818,130 4/1906 Swan ........................ 211/45

*Primary Examiner*—Alexander S. Thomas
*Attorney, Agent, or Firm*—Tilton, Fallon, Lungmus

[57] ABSTRACT

A flat and generally rectangular clipboard is provided with a pair of integral L-shaped spring members that are normally coplanar with the remainder of the board but may be flexed into raised and tensioned positions to hold sheet materials upon the top surface of the board.

7 Claims, 4 Drawing Figures

CLIPBOARD

BACKGROUND AND SUMMARY

Conventional clipboards commonly consist of rectangular sheets of hardboard having spring-loaded hinged metal clips mounted along the upper edges thereof. Such clips are admittedly effective for holding papers and other sheet materials in place upon the boards; however, they have certain inherent disadvantages that tend to reduce the usefulness and ease of handling of the clipboards as a whole. For example, conventional clipboards almost defy stacking since the spring assemblies tip the overlying boards and tend to cause such boards to slide away from each other. For the same reason, papers placed on top of such a board may slide off of the board unless the clip is used to hold them in place, thereby necessitating use of the clip even in situations where only a momentary support for the sheet materials is desired.

The spring hinge assembly of a conventional clipboard also provides an obstruction to hand movement for persons whose writing style involves placement of their writing hand above the line (as frequently is the case with lefthanders), or for children, artists, and other users who may wish to rotate the board and position their hand directly over the area of the spring clip for the purpose of coloring, sketching, or otherwise marking the sheet materials held upon the board.

In addition to being awkward to use and inconvenient to store, conventional clipboards tend to be relatively expensive because of the multiple-component metal clip assemblies mounted upon such boards. Thus, even though a spring clip assembly does provide a relatively secure gripping means for sheet materials supported upon such a board, it carries with it numerous offsetting disadvantages.

The present invention is concerned with an improved clipboard which overcomes such disadvantages of conventional boards. Specifically, the clipboard of this invention is completely flat when unused, thereby facilitating storage, stacking, and handling; has gripping members formed integrally with the board, thereby reducing complexity and expense; is easily manipulated to raise the spring members for the insertion or release of sheet materials; provides L-shaped members which, partly because of their configuration, exert a relatively even clamping force upon the sheet materials to hold such materials in place and, when so used, do not project above such sheet materials to any appreciable extent, thereby avoiding interference with hand movement and permitting stacking of the boards even when loaded; and provides clamping members which include stop elements for helping to orient sheet materials into proper positions for clamping. Additionally, the spring members are independently operable, may be easily released for permitting selective removal of one or more sheets from a stack, and are oriented so that when a clamping member is manipulated by a finger or fingers (ordinarily the index finger) of one hand, other fingers of the same hand may be used simultaneously to support the clipboard and to urge the sheet materials into or out of position.

Briefly, the clipboard takes the form of a flat and generally rectangular board of rigid but still somewhat flexible material. A hard durable polymeric material such as an acrylonitrile-butadiene-styrene (ABS) copolymer of a thickness within the range of about 0.07 to 0.15 inches has been found particularly effective, but other materials and thicknesses may be used. One edge of the board, an edge that would be commonly referred to as the top edge, is provided with cutouts defining a pair of integral L-shaped spring members normally flush with the remainder of the board. Each L-shaped member has a first leg portion extending along the top edge of the board and a second leg portion projecting into the board away from the top edge. The second leg portion of each L-shaped member provides an undersurface engagable with the sheet materials supported upon the board. Each such second leg portion is generally elongated and, when elevated from the remainder of the board in its clamping position, extends along a line generally parallel with the board's surface.

The first leg portion—that is, the leg portion of each L-shaped member that extends along the board's upper edge—serves as a stop element to limit the extent of upward movement of a sheet of paper or other material as it is inserted beneath the clamping member. To lift each clamping member, the user simply holds the board by its upper corners and flexes the first leg portion of each member upwardly while at the same time using his (her) thumbs to slide the sheet material into or out of position with respect to the second leg portions of the L-shaped members.

Other features, advantages, and objects of the invention will become apparent from the specification and drawings.

DRAWINGS

DETAILED DESCRIPTION OF PREFERRED EMBODIMENT

Figure 1:
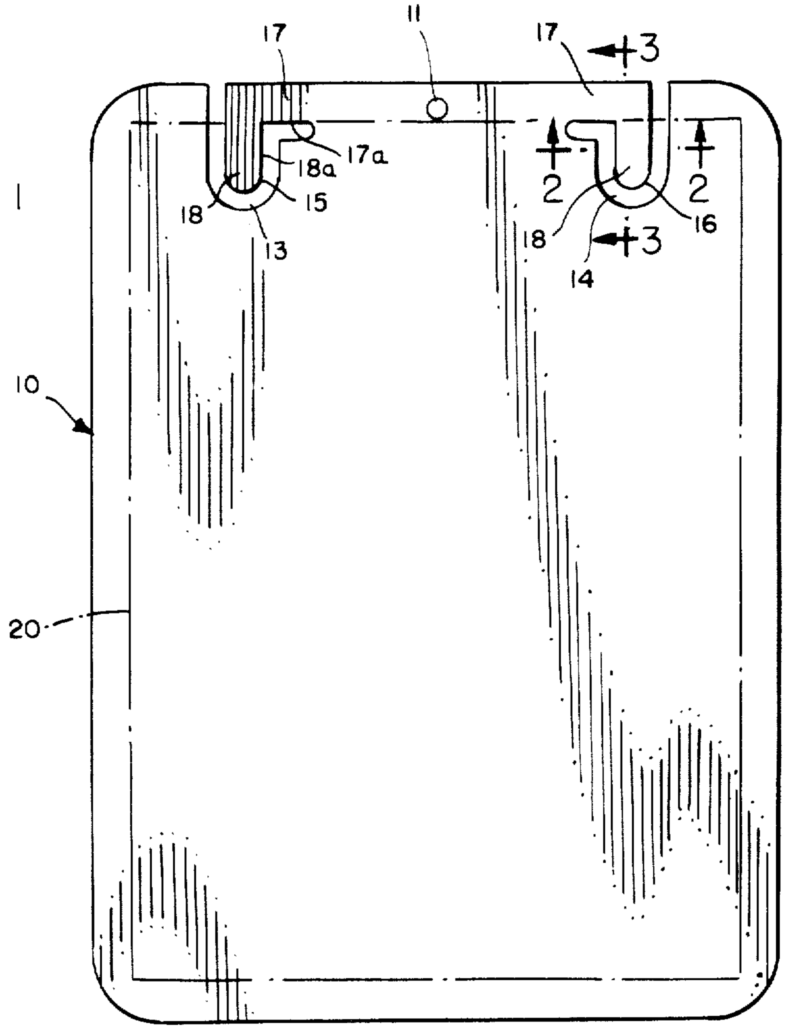
FIG. 1 is a plan view of a clipboard embodying the invention.

Referring to the drawings, the numeral 10 generally designates a clipboard comprising a flat rectangular board of rigid but nevertheless somewhat flexible or spring-like material. Any of a variety of rigid plastic materials may be used, and such materials may be either die-cut or injection molded. Acrylonitrile-butadiene styrene (ABS) copolymers have been found particularly effective, but other polymers or copolymers may be suitable. Impregnated fibrous materials and even metal sheeting might also be effective, although such materials are believed less suitable than rigid flexible plastics. Where a polymeric material is selected, and particularly in the case of ABS, the thickness of the board should fall within the range of about 0.07 to 0.15 inches. The planar dimensions of the board may be varied depending on the sizes of the sheets to be supported thereon; for example, a clipboard designed for letter-size sheets might have dimensions of $9\times13$ inches, whereas a board suitable for legal-size sheets might be $9\times15$ inches. Preferably, the corners of the rectangular board are rounded as shown, and an aperture 11 is centrally located adjacent the top edge 12 of the board to permit the board to be hung from a suitable support.

Adjacent the upper corners of the board are cutouts 13 and 14 which define L-shaped members 15 and 16 formed integrally with the remainder of the board. The two members 15 and 16 are mirror images of each other, as are cutouts 13 and 14. Each L-shaped member has a first leg portion 17 which extends along the upper edge of the board and a second leg portion 18 at right angles to the first leg portion. The second leg portion 18 is elongated and extends inwardly towards the body of the board. The second leg portions of the two L-shaped members 15 and 16 are parallel with each other and extend along the long axis of the rectangular board. While each L-shaped member is oriented with the first leg portion extending outwardly or laterally towards its point of merger with the upper end of the second leg portion 18, such orientation might be reversed, with the first leg portion instead extending inwardly or medially towards its point of merger with the upper end of the second leg portion. Also, while the two L-shaped members 15 and 16 are shown to be spaced a substantial distance apart, each being located adjacent an upper corner of the board, such members might if desired be positioned more closely together.

The distal or lower ends of leg portion 18 are preferably rounded as shown. The cutouts that define the L-shaped members may be varied in width, but it has been found that a width in the range of 1/16 to ⅜ inches, and preferably about ¼ inches, is particularly effective. The length of each leg portion may also be varied, but the elongated depending leg portions 18 should fall generally within the range of 1½ to 2½ inches in length, and the lateral leg portions 17 within the range of 1 to 2 inches in length. In a preferred embodiment, the undersurface of the board is roughened or embossed and the top surface is smooth (FIGS. 2 and 3); such embossing of the undersurface reduces the tendency for the board to slide when supported upon a user's knee or other suitable support and, in addition, helps to promote the gripping action of the leg portions 18 of L-shaped members 15 and 16.

Figure 3:
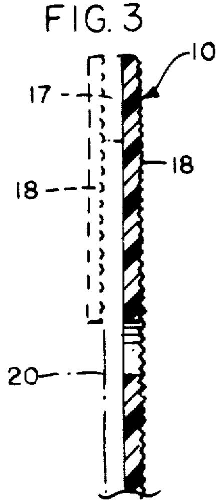
FIG. 3 is an enlarged cross sectional view taken along line 3—3 of FIG. 1.
Figure 2:
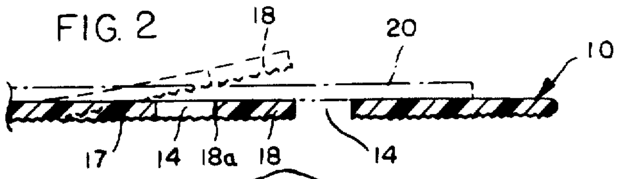
FIG. 2 is an enlarged fragmentary sectional view taken along line 2—2 of FIG. 1, such view depicting in dashed lines the position of a clamping member when a stack of sheet materials (shown in phantom) are supported by the board.

Normally, the L-shaped members have their upper and lower surfaces flush with the upper and lower surfaces of the remainder of the board. When sheet materials are to be clipped to the board, the user simply lifts leg portions 18, slips the sheet materials 20 beneath those portions, and then releases the L-shaped members so that they spring back into clamping engagement with materials 20 (FIGS. 2 and 3). Such operations are accomplished easily when the board is held as shown in FIG. 4, with the user's index fingers engaging the undersides of the lateral leg portions 17, the thumbs bearing against the top surface of sheet material 20 to urge that material beneath leg portions 18 as the L-shaped members are flexed upwardly, and the remaining fingers of each hand bearing against the undersurface of the board to brace the board and hold it in the position shown.

When one or more sheets 20 are clipped to the board, they are held in place by the inner longitudinal edges 18*a* of the longitudinally-extending leg portions 18 (FIG. 2). It will be noted that contact is made along a substantial length of the longitudinal leg portion 18 because the flexing action occurs primarily along lateral leg portion 17 and, therefore, during such action leg portion 18 tends to remain substantially parallel with the surface of the board and the sheet materials 20 supported thereon (FIG. 3). Therefore, substantial engagement is made between the L-shaped members and the sheet materials, helping to insure an effective holding action on such materials.

Figure 4:
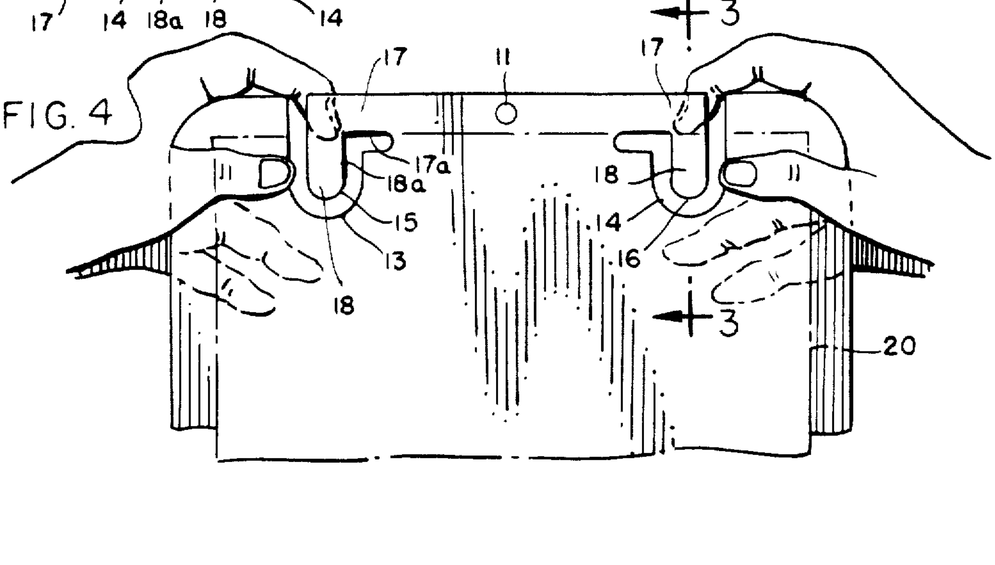
FIG. 4 is a plan view illustrating a preferred manner of operating the clipboard.

When the sheet materials are properly clamped upon the board, the upper edges of those materials are in close proximity to the lower edges 17*a* of laterally-extending leg portions 17 (FIG. 4). Since the L-shaped portions are flexed upwardly, such leg portions 17 effectively serve as stops to limit the extent of upward movement of the sheet materials.

Even when a stack of sheet materials is clamped upon the board and the L-shaped members 15 and 16 are therefore flexed upwardly as shown by broken lines in FIGS. 2 and 3, such members do not project a substantial distance above the clamped sheets 20. Consequently, the L-shaped clamping members present only minimal interference or resistance to movement of a user's hand over such members as, for example, in the case of a lefthanded writer who positions his (her) hand above the line when writing. Furthermore, since the entire clipboard is integrally formed from sheet material, it is believed apparent that such board is relatively simple and inexpensive to fabricate and, unlike conventional clipboards, may be easily handled and stacked.

While in the foregoing I have disclosed an embodiment of the invention in considerable detail for purposes of illustration, it will be understood by those skilled in the art that many of these details may be varied without departing from the spirit and scope of the invention.

I claim:

1. A clipboard comprising a flat and generally rectangular board of substantially rigid but flexible, spring-like material; said board having cutouts along one edge thereof defining a pair of integral L-shaped spring members normally flush with the remainder of said board; each of said L-shaped members having a first leg portion extending along said one edge and an elongated second leg portion projecting into said board away from said one edge; said elongated second leg portion having a length within the range of about 1.5 to 2.5 inches; said second leg portion providing an undersurface engagable with sheet materials supported upon said board for holding said sheet materials in place.

2. The clipboard of claim 1 in which said first leg portion provides a stop element for limiting upward movement of sheet materials upon said board.

3. The clipboard of claim 1 in which said first leg portions of the respective L-shaped members extend outwardly away from each other.

4. The clipboard of claim 3 in which said second leg portions of the respective L-shaped members are generally parallel with each other.

5. The clipboard of claims 1, 3, or 4 in which said L-shaped members are located adjacent the corners of said board.

6. The clipboard of claim 1 in which the undersurface of said board is roughened.

7. The clipboard of claim 1 in which said board is formed integrally of polymeric material.

* * * * *